(12) United States Patent
Kling

(10) Patent No.: US 6,577,065 B2
(45) Date of Patent: Jun. 10, 2003

(54) ELECTRIC LAMP WITH LIGHT SOURCE EXTINGUISHING ARRANGEMENT AND METHOD OF OPERATING SAME

(75) Inventor: Michael R. Kling, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 8 days.

(21) Appl. No.: 09/963,701

(22) Filed: Sep. 26, 2001

(65) Prior Publication Data

US 2003/0062857 A1 Apr. 3, 2003

(51) Int. Cl.[7] .............................. H01J 13/46; H01K 1/50
(52) U.S. Cl. ............................ 315/56; 315/58; 315/46; 315/108; 313/579; 313/580; 313/623; 313/27
(58) Field of Search ............................ 315/56, 58, 59, 315/73, 74, 108, 46, 106; 313/25, 26, 579, 580, 623, 634, 27

(56) References Cited

U.S. PATENT DOCUMENTS

| | | | | |
|---|---|---|---|---|
| 3,619,682 A | * | 11/1971 | Lo et al. ...................... | 313/22 |
| 4,013,919 A | * | 3/1977 | Corbley ........................ | 315/73 |
| 4,143,301 A | * | 3/1979 | Strauss et al. ................ | 315/73 |
| 4,195,251 A | * | 3/1980 | Bamberg ...................... | 315/73 |
| 4,229,678 A | * | 10/1980 | Petro ............................ | 315/73 |
| 4,361,782 A | * | 11/1982 | Reiling ......................... | 315/73 |
| 4,388,557 A | * | 6/1983 | Shaffer ......................... | 315/74 |
| 4,752,718 A | * | 6/1988 | Strauss et al. ................ | 315/73 |
| 4,942,330 A | * | 7/1990 | Karlotski et al. ............. | 313/25 |
| 6,462,478 B1 | * | 10/2002 | Oetken et al. ................ | 315/73 |

* cited by examiner

Primary Examiner—Don Wong
Assistant Examiner—Tuyet T. Vo
(74) Attorney, Agent, or Firm—William E. Meyer

(57) ABSTRACT

An electric lamp is provided which includes a sealed thin-walled outer envelope containing a fill gas having a high thermal conductivity. A lamp capsule is contained within the outer envelope and is in series with an oxidizable fuse also contained within the outer envelope. The fill gas serves to reduce the temperature of the fuse during normal operation of the lamp thereby reducing the power loss in the fuse, increasing overall lamp efficacy and eliminating glow of the fuse. The lamp capsule is quickly extinguished if the outer envelope is broken and the fuse exposed to air. In one embodiment, an incandescent lamp is provided wherein the lamp capsule is a tungsten halogen capsule, the fuse is a tungsten coil wire and the fill gas is helium.

27 Claims, 3 Drawing Sheets

ELECTRIC LAMP WITH LIGHT SOURCE EXTINGUISHING ARRANGEMENT AND METHOD OF OPERATING SAME

TECHNICAL FIELD

The present invention relates to an electric lamp which includes an end-of-life device that will safely extinguish the source of light when an outer lamp envelope is broken, without adversely substantially affecting lamp efficacy or providing an undesirable second light source during normal lamp operation. The present invention is particularly of interest regarding a tungsten halogen lamp.

BACKGROUND ART

A problem with some electrical lamps is that they present a fire hazard and may cause burns should the outer lamp envelope break. Although there is more than one type of lamp with respect to which this problem applies, the problem is particularly applicable to tungsten halogen lamps. Due to higher efficacy and coil temperatures, tungsten halogen lamps are attractive as replacements for ordinary incandescent filament lamps for general service lighting. However, tungsten halogen lamps typically operate at high bulb wall temperature and high internal pressure. For these reasons, tungsten halogen lamps are usually operated in fixtures with shielding to protect against accidental contact. The use of special fixtures increases the cost of using a tungsten halogen lamp and limits its usefulness to those applications where use of such a fixture is practical. In an alternative embodiment, it is known to seal the typical halogen capsule in an outer envelope having a thick wall that performs the shielding function. However, the use of thick walls increases the cost of the lamp and reduces the transmission of light. In addition, the thick walls of the lamp adds to its weight which can be a problem with some fixtures.

The use of a tungsten halogen lamp having a thin outer envelope is well know. However, such lamps present a potential safety hazard should the outer envelope break and the inner halogen capsule continue to operate. In particular, the wall temperature of the tungsten halogen inner capsule is high enough to cause burns and to ignite various materials such as paper and fabric. The safety problem is compounded due to the fact that such lamps may be intended as replacement lamps for general service incandescent lamps and therefore are likely to be used in a wide variety of lighting fixtures, some of which could easily be tipped over or damaged in such a way as to break the outer glass envelope exposing the still burning inner halogen capsule.

The use of other types of lamps involve problems similar to those of tungsten halogen lamps. For example, high pressure discharge lamps include an inner arc tube contained within an outer envelope. One of the functions of the outer envelope is to permit passage of visible light, and block ultraviolet radiation, emitted by the inner arc tube during use of the lamp. Should the outer envelope be broken, such ultraviolet radiation will be emitted out of the lamp into the environment proximate the lamp.

A number of ways have been disclosed to interrupt electrical current to an inner lamp in the event of damage to an outer lamp envelope. For example, it is known to provide a high intensity discharge (HID) lamp having a mechanical switch, the circuit provided thereby being opened when the outer lamp envelope is broken. An example of such a lamp is described in U.S. Pat. No. 4,229,678. One problem with a mechanical switch is that opening of the switch requires sufficient outer envelope breakage adjacent the switch. Pin point breakage or breakage at a spot remote from the switch will not cause the switch to open the circuit.

It is also known to provide an HID lamp having an oxidizable fuse in the outer envelope which oxidizes and interrupts the lamp circuit in the event the outer envelope breaks and admits air. One preferred fuse material is a self-heated metal wire or coil that is reactive in the presence of air. An example of a lamp which includes an oxidizable fuse within the outer envelope is described in U.S. Pat. No. 4,361,782. One problem with the use of an oxidizable fuse is that substantial power is consumed in the fuse resulting in reduced lamp efficacy. Another problem is that most suitable fuse metals require incandescent temperatures in order to burn in air and therefore present a secondary and non-aesthetic light source within the outer envelope during normal lamp use.

It is also known to provide a pressure switch within the outer lamp envelope, such pressure switch being designed to open the lamp circuit when exposed to normal atmospheric pressure after the outer lamp envelope breaks. An example of such a lamp is described in U.S. Pat. No. 4,143,301. One problem with the use of a pressure switch is that it is bulky and expensive.

DISCLOSURE OF THE INVENTION

It is an object of the present invention to provide an improved lamp.

It is another object of the present invention to obviate the disadvantages of the prior art by providing an improved lamp.

A further object of the present invention is to provide an economical, efficient and high quality lamp.

Another object of the present invention is to provide a lamp having an oxygen sensitive end-of-life device operable at low wattage.

Yet another object of the present invention is to provide a lamp having an end-of-life device that consumes a reduced amount of power, and therefor does not reduce lamp efficacy, during normal operation.

A further object of the present invention is to provide for extinguishing an inner lamp upon breakage of an outer envelope using an end-of-life device, yet reduce the power consumed by the end-of-life device during normal lamp operation to less than about 0.5% of nominal lamp power.

Yet a further object of the present invention is to provide a safe tungsten halogen lamp having a thin walled outer envelope.

Another object of the present invention is to provide for automatically extinguishing an inner lamp in less than 60 seconds, and preferably in less than 5 seconds, measured from breakage of an outer lamp envelope.

A further object of the present invention is to provide a lamp having a end-of-life device which does not present a secondary and non-aesthetic light source during normal lamp operation.

Yet a further object of the present invention is to provide an improved method of operating an electric lamp.

This invention achieves these and other objects by providing an electric lamp, which includes a sealed first envelope enclosing an environment and being transparent to light. A first electrical conductor and a second electrical conductor are sealed into and pass through the first envelope and are electrically connectable externally of the first envelope to a source of electrical power. An electric lamp capsule, contained within the environment, comprises a sealed second envelope, a first lead wire and a second lead wire sealed into and passing through the second envelope, the first lead wire being electrically connected to the first electrical conductor and the second lead wire being electrically connected to the second electrical conductor, to provide a lamp circuit. An end-of-life device is contained within the environment and is electrically connected in series with the lamp circuit. The end-of-life device is of the type that will rapidly ignite during lamp operation in the presence of air to open the lamp circuit. A filling is contained within the environment, the filling being inert at least relative to the end-of-life device. The filling has a thermal conductivity high enough to cool the end-of-life device during energization of the electric lamp capsule within the sealed first envelope sufficiently to lower resistance and power loss in the end-of-life device, thereby increasing lamp efficacy and eliminating visual radiation of the end-of-life device. A method of operating the electric lamp of the present invention is also described.

BRIEF DESCRIPTION OF THE DRAWINGS

This invention may be clearly understood by reference to the attached drawings in which like reference numerals designate like parts and in which.

MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
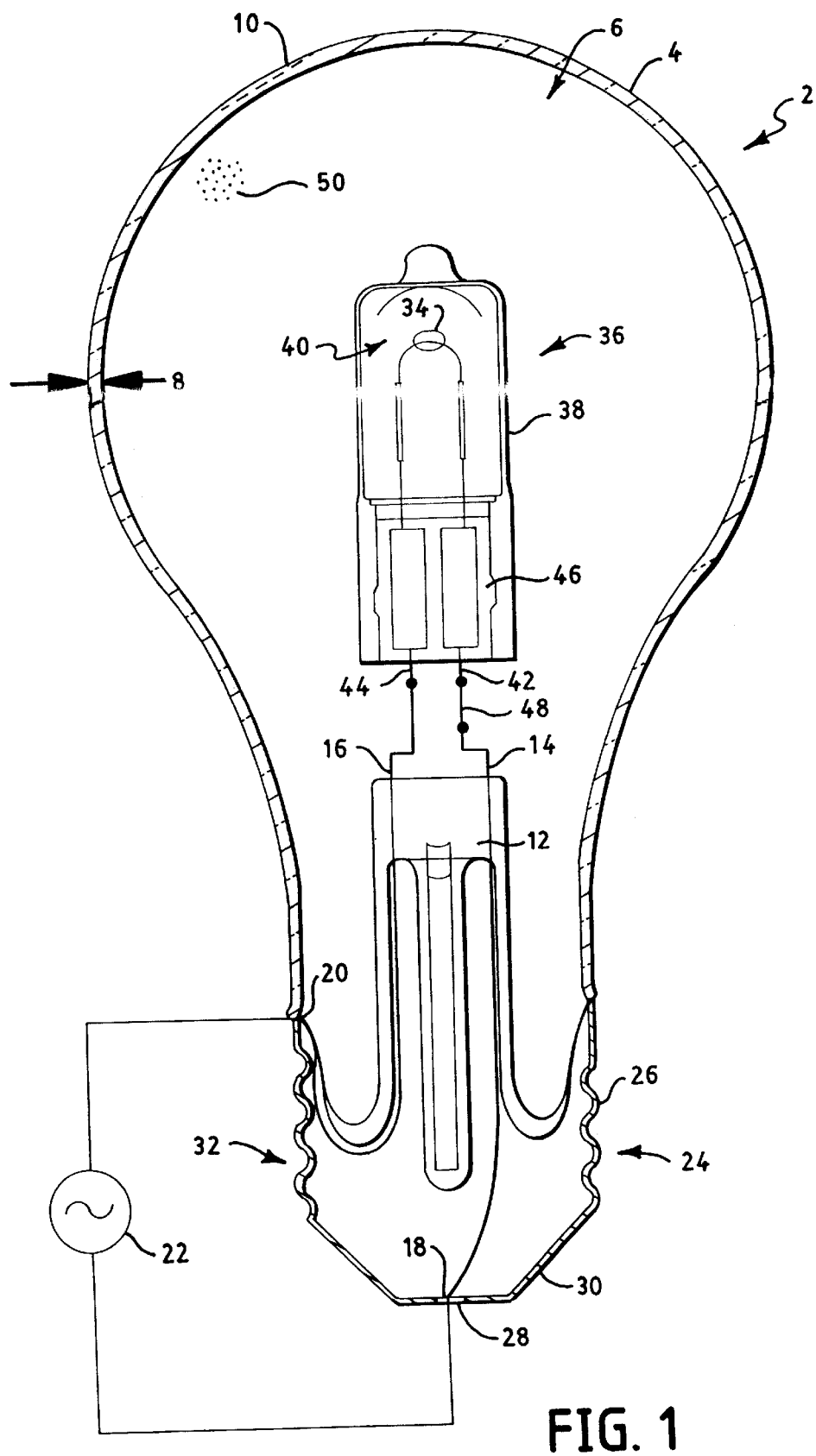
FIG. 1 is a diagrammatic illustration of one embodiment of an electric lamp of the present invention.

The embodiments of this invention which are illustrated in the drawings are particularly suited for achieving the objects of this invention. FIG. 1 is a diagrammatic illustration of one embodiment of an electric lamp of the present invention. In the embodiment illustrated in FIG. 1, the lamp is an incandescent tungsten halogen lamp. Without limitation, the present invention is applicable to other types of lamps such as high intensity discharge lamps. As a practical matter, the present invention is useful in any lamp where a safety hazard could exist if the outer lamp envelope is broken but the actual source of light remains energized. In the embodiment illustrated in FIG. 1, an electric lamp 2 is illustrated which comprises a sealed outer envelope 4 which encloses an air tight first environment 6.

The envelope 4 is a vitreous material which is transparent to light. Envelope 4 may be fabricated in a conventional manner. The thickness 8 of the wall 10 which forms the envelope 4 is thin relative to that of a conventional tungsten halogen lamp. For example, the thickness of the outer envelope of a conventional tungsten halogen lamp is about 3 to 6 mm. In contrast, the thickness 8 may be about equal to that of the envelope of a conventional Edison-type lamp; that is, about 0.5 to 0.75 mm. The envelope 4 is sealed in a conventional manner at stem 12. First and second electrical conductors 14 and 16 are sealed into and pass through the envelope 4 at the stem 12 in a conventional manner. The ends 18 and 20 of the conductors 14 and 16 are electrically connectable external of the envelope 4 to a source 22 of electrical power. To this end, in the embodiment illustrated in FIG. 1, a conventional screw-type lamp base 24 is provided. Lamp base 24, which includes a metal base shell 26 and contact 28 separated by an insulator 30, is mechanically connected to the envelope 4 in a conventional manner. The lamp base 24 is electrically connected to conductors 14 and 16. To this end, end 20 of conductor 16 is welded to a side tap at the inner surface of the shell 26, and end 18 of conductor 14 is welded to contact 28 which forms a center tap, in a conventional manner. The metal base shell 26 is threaded at 32 for insertion into a mating internally threaded lamp socket (not shown).

The electric lamp of the present invention includes an electric light source contained within the sealed outer envelope. For example, in the embodiment illustrated in FIG. 1, a light source 34 is contained within an electric lamp capsule 36. Lamp capsule 36 includes a sealed second envelope 38 contained within the first environment 6 enclosed by envelope 4. The envelope 38 encloses an air tight second environment 40. The envelope 38 is a vitreous material which is transparent to light. The electric lamp capsule 36 includes a first lead wire 42 and a second lead wire 44 sealed into and passing through the stem 46 of the capsule 36 in a conventional manner. The lamp capsule 36 may be in the form of a conventional tungsten halogen capsule contained within the first environment 6. Lead wires 42 and 44 are electrically coupled to electrical conductors 14 and 16, respectively, as described in more detail hereinafter, to provide for a lamp circuit. An end-of-life device is contained within the first environment enclosed by the outer envelope of the present invention. The end-of-life device is electrically connected in series with the lamp circuit. For example, in the embodiment illustrated in FIG. 1, an end-of-life device in the form of an oxidizable fuse 48 is contained within the environment 6 enclosed by the outer envelope 4. Fuse 48 is electrically in series with lead wires 42 and 44 of the lamp capsule 36. To this end, the fuse 48 is electrically connected between electrical conductor 14 and the lead wire 42, and the electrical conductor 16 is electrically connected to the lead wire 44.

The end-of-life device of the present invention is of the type that will rapidly ignite during operation of the lamp in the presence of air to open the lamp circuit. The end-of-life device is positioned external of the lamp capsule and within the hermetically sealed thin wall outer envelope. In the embodiment illustrated in FIG. 1, the fuse 48 is of the type that will ignite in the presence of air to open the circuit that the fuse completes between the electrical conductor 14 and the lead wire 42.

The end-of-life device of the present invention, such as fuse 48, may be chosen from various types. For example, a straight or coiled foil or wire filament may be used. One preferred simple and cost effective end-of-life device is a coiled wire fuse. Any of a number of materials may be used. For example, metal or metal alloys that react with air at an elevated temperature, as described hereinafter, may be selected. Tungsten, tantalum, zirconium, halfnuim and aluminum are examples of metals which can be used. A preferred end-of-life device may be in the form of a coiled tungsten wire represented in FIG. 1 as the fuse 48. The coiled tungsten wire provides a pyrophoric fuse. Whatever form of end-of-life device is used, it must be capable of rapid ignition during lamp operation in the presence of air to thereby open the lamp circuit. In particular, if the outer envelope is damaged sufficiently to permit air to enter the air tight environment 6, the combination of radiation, convective and conductive heat flowing from the light source, in addition to any resistive self-heating of the end-of-life device generated by the lamp current during operation of the lamp will raise the temperature of the end-of-life device to a level at which exposure of the end-of-life device to the air will cause rapid oxidation of the end-of-life device, thereby opening the lamp circuit and extinguishing the light source and the heat generated thereby. In the embodiment illustrated in FIG. 1, coiled tungsten wire fuse 48 provides one means for rapidly opening the lamp circuit during operation of the light source in the presence of air.

The specifications of the end-of-life device will vary with the wattage of the lamp. However, regardless of lamp wattage, at rated lamp current, the temperature of the end-of-life device should exceed about 1400° K in a 1 bar nitrogen atmosphere. This will ensure rapid burning of the end-of-life device when exposed to air. An end-of-life device that opens the lamp circuit in at least less than about 60 seconds when exposed to air is desirable in some applications to reduce the risk of fire. A preferred embodiment will open the lamp circuit in five seconds or less when exposed to air. If a coil is used a preferred range of coil temperature is 1400° K to 2200° K. Although temperatures in excess of 2200° K will decrease the time required for the fuse to open when exposed to air, the result will be an undesirable decrease in lamp efficacy. Temperatures below 1400° K will result in an undesirable increase in the time required for the fuse to open when exposed to air.

Table 1 noted below lists the specifications for the end-of-life devices in the form of tungsten coil wire fuses for four typical lamp voltages.

conductivity of the gas is sufficiently high to accomplish the foregoing results. In the embodiment of FIG. 1, the filling 50 is pure helium gas. Pure helium gas is particularly useful in practicing the present invention. For example, one embodiment of the lamp structure of the present invention, including tungsten coil wire fuse used in combination with pure helium fill gas, was compared at various lamp wattages with an identical lamp structure but substituting a nitrogen fill gas for the pure helium. It was observed that a tungsten coil wire fuse operated in a nitrogen outer envelope fill gas will have a voltage drop of about 2.5 to 3.6 volts causing (a) an undesirable drop in lamp efficacy of about 2 to 3% depending on lamp wattage, and (b) the coil to glow and to provide a secondary non-aesthetic light source within the outer envelope. By way of comparison, an identical tungsten coil wire fuse operated in a pure helium outer envelope fill gas will reduce the voltage drop across the fuse by about 75 to 80% thereby (a) increasing lamp efficacy by about 2% and (b) eliminating the glow of the fuse. In considering the foregoing results, it is observed that helium has 5.8 times the thermal conductivity as nitrogen. Such increased cooling capacity reduces the tungsten fuse temperature. For example, peak temperature for a tungsten coil wire fuse designed for a 60W capsule operating at 0.5 amps in nitrogen gas measures about 2000° K, and the fuse glows. In the same lamp having a helium gas fill, the temperature of the tungsten fuse could not be measured with a disappearing wire pyrometer (indicating a fuse temperature of less than 1000° K), and the fuse no longer glowed. Such reduction in fuse temperature provides a desirable corresponding drop in resistance and power loss in the fuse.

The present invention is not limited to the use of a pure helium gas filling. As noted above, any inert gas or combi-

TABLE 1

Proposed fuse coil designs

| Lamp Wattage (W) | Nominal Current (A) | Exp. Power (W) | Coil Temp (K) | Wire Dia. (mils) | Primary Pitch (TPI) | Mandrel Dia. (mils) | Mandrel Ratio | Pitch (%) | Active Length (mm) |
|---|---|---|---|---|---|---|---|---|---|
| 40 | 0.333 | 1.20 | 2185 | 1.47 | 451 | 3.5 | 2.38 | 151 | 21.1 |
| 60 | 0.500 | 1.49 | 2188 | 1.92 | 320 | 4.7 | 2.45 | 163 | 20.0 |
| 75 | 0.625 | 1.65 | 2190 | 2.19 | 268.2 | 5.0 | 2.28 | 170 | 18.2 |
| 100 | 0.833 | 2.08 | 2197 | 2.56 | 218 | 6.0 | 2.34 | 179 | 17.6 |

The electric lamp of the present invention includes a filling contained within the environment enclosed by the outer envelope. The filling is inert at least relative to the end-of-life device. In addition, the filling has a relatively high thermal conductivity. This is contrary to conventional lamp manufacturing practice where it is desired to minimize thermal losses and/or minimize the cost of the outer envelope fill gas when a fill gas is in fact used. In considering the thermal conductivity of the filling of the present invention, such thermal conductivity must be high enough to cool the end-of-life device during energization of the light source, within the sealed outer envelope, sufficiently to at least reduce the loss of lamp efficacy and visible light emitted by the end-of-life device. Preferably, the thermal conductivity will be high enough to cool the end-of-life device sufficiently to lower resistance and power loss in the end-of-life device, thereby increasing lamp efficacy and eliminating visual radiation of the end-of-life device. As a practical matter, the filling conducts away from the end-of-life device the heat generated therein during normal use of the energized lamp capsule. The filling may be any gas which is inert relative to the end-of-life device so long as the thermal nation of gases can be used provided the thermal conductivity of the filling is sufficiently high as described herein to cool the end-of-life device during lamp operation as described above. For example, helium gas, or neon gas or hydrogen gas, or mixtures thereof or with other gases may be used. Even nitrogen might be combined with helium provided the thermal conductivity of the combination is sufficiently higher to reduce the temperature of the end-of-life device to the extent required as described herein. Regardless of the particular filling of the present invention used, the high thermal conductivity thereof will conduct heat away from the end-of-life device thereby reducing the peak temperature thereof during normal lamp operation. However, the temperature of the fuse element will rapidly climb in the presence of air which has a substantially lower thermal conductivity, thereby opening the lamp circuit and extinguishing the lamp. In other words, when the outer envelope breaks, the cooling gas will be dissipated, the temperature of the end-of-life device will increase, the air will ignite the fuse, and the lamp circuit will be opened.

In one embodiment of the present invention, supporting structure is provided to hold the end-of-life device in place.

Figure 2:
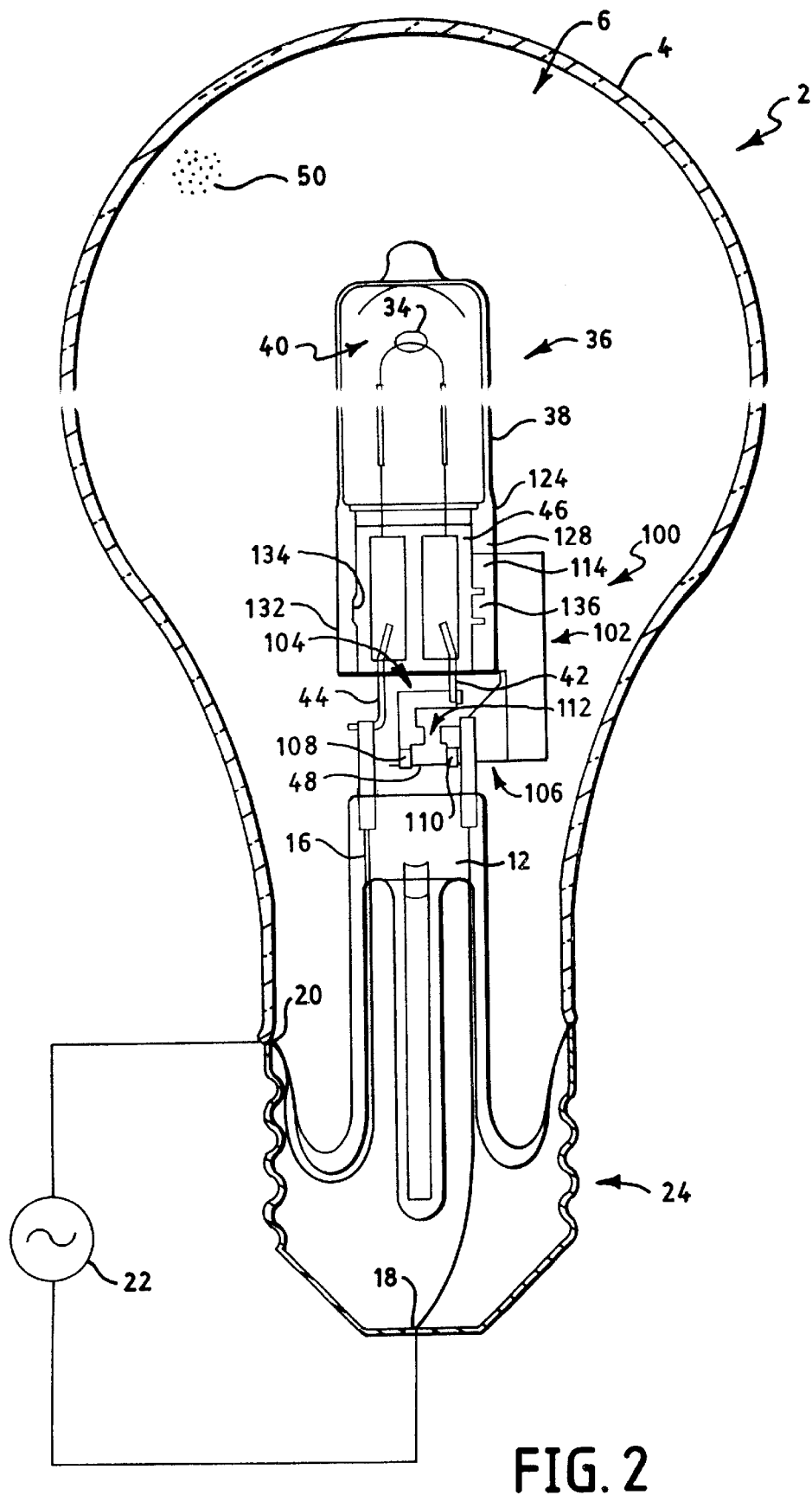
FIG. 2 illustrates another embodiment of an electric lamp of the present invention.
Figure 3:
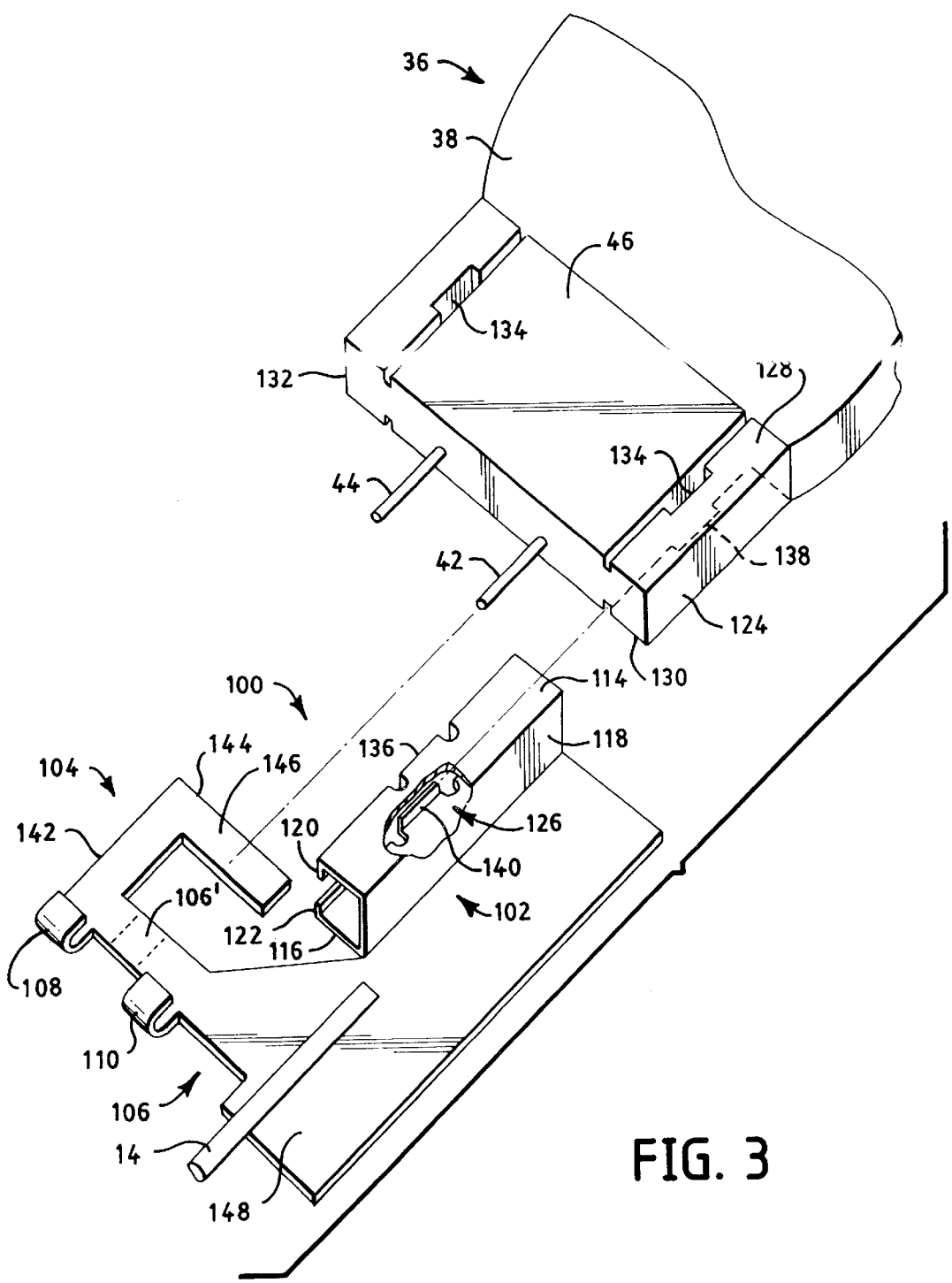
FIG. 3 illustrates the support for the end-of-life device and lamp capsule illustrated in the embodiment of FIG. 2.

This simplifies manufacturing, reduces component count and ensures accurate control of fuse length, an important parameter for lamp performance. The supporting structure also serves to hold the lamp capsule in place. For example, FIGS. 2 and 3 illustrate one embodiment of a support 100 for an end-of-life device 48 for use with the electric lamp 2 of FIG. 1. FIG. 2 illustrates the support 100 assembled with the lamp 2, and FIG. 3 illustrates the support prior to assembly. Support 100 includes a first portion 102 mechanically connectable to the lamp capsule 36. A conductive second portion 104 of the support 100 is electrically and mechanically connectable to the first lead wire 42, as for example, by welding. The support 100 also includes a conductive third portion 106 electrically and mechanically connected to the first electrical conductor 14. The end-of-life device 48 is electrically and mechanically connected between the second portion 104 and the third portion 106. In this manner, the end-of-life device is incorporated into the capsule support which improves manufacturing and reliability. To this end, the end-of-life device 48 can be connected to the second portion 104 and third portion 106 by welding, if desired. However, in the embodiment illustrated in FIG. 2, the end-of-life device 48 is connected to the second portion 104 and third portion 106 by clamps 108 and 110, respectively. Clamps 108 and 110 are in the form of folded over legs which extend from the body of respective portions 104 and 106. To attach the end-of-life device 48 to the support 100, the end-of-life device is positioned to extend between the portions 104 and 106 and lie within the clamps 108 and 110, the clamps then being closed to firmly hold the end-of-life device in place. A section 106' (FIG. 3) of the third portion 106 is removable to separate the second portion 104 and third portion 106 as illustrated at the gap 112 in FIG. 2, and described in more detail hereinafter. In one embodiment, the support 100 is formed from 0.38 mm thick stainless steel. However, the support 100 can be made of any material that can be formed into the proper shape and provide the required electrical conductivity.

In one embodiment of the present invention, the support for the end-of-life device may be attached to a lamp capsule having a stem, in which case the first portion of the support may be connectable to the stem. For example, in the embodiment illustrated in FIGS. 2 and 3, the lamp 2 includes the lamp capsule 36 which includes the stem 46, and the first portion 102 of the support 100 is mechanically connected to the stem. To this end, in the embodiment illustrated in FIGS. 2 and 3, the support 100 comprises opposing walls 114 and 116 each of which extends away from a base 118 to opposing wall flanges 120 and 122, respectively. Walls 114 and 116, including flanges 120 and 122, are structured and arranged to slidingly mate with the stem 46. For example, in the embodiment illustrated in FIGS. 2 and 3, the stem 46 is fabricated to include a rail 124. Rail 124 may be dimensioned so that it may be force fit into the opening 126 between the walls 114 and 116 of the support 100, the walls bearing against respective rail surfaces 128 and 130 to hold the lamp capsule 36 in place relative to the support 100. The lamp capsule 36 may be provided with an identical opposite second rail 132 so that support 100 may be connected to either side of the stem 46 thereby eliminating the need to align a specific side of the stem with the support during the assembly process. In the embodiment illustrated in FIG. 3, the stem 46 has an I-beam configuration, the support 100 being structured and arranged to slide on either rail of the stem.

The stem 46 of the capsule 36 may be of the type having one or more locking segments that engage respective mating locking segments of the support walls to hold the capsule in place relative to the support. Such locking segments and mating locking segments may be in addition to or used in place of the force fit embodiment discussed above. For example, in the embodiment illustrated in FIGS. 2 and 3, the stem rail 124 includes a locking segment in the form of a recess 134 in surface 128, and the wall 114 includes a mating locking segment in the form of a detent 136. The recess 134 and detent 136 are structured and arranged such that when the rail 124 is inserted into the opening 126 between walls 114 and 116, the detent 136 will engage the recess 134 by snapping into the recess 134, when the lamp capsule 36 is properly axially positioned relative to the support 100, to hold the lamp capsule 36 in place relative to the support. In the embodiment illustrated in FIG. 3, the rail 124 includes a similar recess 138, in surface 130, that engages a similar detent 140 in wall 116, in the same manner. Rail 132 may include similar recesses 134 and 138.

In the embodiment illustrated in FIGS. 2 and 3, the second portion 104 of the support 100 comprises a first segment 142 extending from the third portion 106, and a second segment 144 extending from the first segment 142. The lead wire 42 is electrically and mechanically connected to the second segment 144, as for example, by welding the lead wire to surface 146.

The first segment 142 is parallel to the base 118 of the first portion 102 and the second segment 144 is perpendicular to the base 118. The electrical conductor 14 is electrically and mechanically connected to the third portion 106, as for example, by welding the electrical conductor to surface 148.

One method of fabricating the electric lamp of the present invention will now be described with reference to the electric lamp 2. A conventional lamp capsule 36 is formed having a first lead wire and a second lead wire. One example of such lamp capsule is a tungsten halogen capsule. A support is then attached to the capsule. For example, the support 100 may be attached to the stem 46 of the capsule 36 as described herein. Although not necessary, after the detents of the support engage the recesses of the stem, the support may be heated to the extent that melted stem glass further affixes the support to the stem. The lead wire 42 of capsule 36 is then welded to the surface 146 of the second portion 104 of the support 100. The next step is to remove the section 106' of the third portion 106 of the support 100 to form the gap 112 between the second portion 104 and third portion 106. This may be accomplished, for example, by mechanical cutting or burning out the section 106' using a laser or plasma torch. Any convenient gap width can be used. In the lamp illustrated in FIGS. 2 and 3, the gap is about 2–3 mm wide. Removal of the section 106' serves to separate the second portion 104 from the third portion 106. The end-of-life device 48 is then electrically and mechanically connected to the second portion 104 and third portion 106 of the connector 100, thereby providing structure that forces any current flow in the lamp circuit through device 48. To this end, in the embodiment illustrated in FIGS. 2 and 3, the coiled tungsten wire fuse 48 is fed into clamps 108 and 110, the fuse bridging the gap 112. The clamps 108,110 are closed to grip the fuse 48 and hold it in place. A glass stem assembly is prepared in a conventional manner, the stem including a conventional flared glass tube and exhaust tube, and the two electrical conductors 14 and 16. Electrical conductor 14 is then welded to surface 148 of the third portion 106 of the support member 100, and electrical conductor 16 is welded to the lead wire 44. The electrical conductor 14 may be more heavy duty than the electrical conductor 16 to provide sufficient support for the support 100 and lamp capsule 36 attached thereto. The lamp capsule 36, support 100, and stem assembly are then inserted into an outer envelope 4 which is then heated and melted down onto the stem 46 so that the stem fuses with and becomes part of the envelope 4, in a conventional manner. The lamp thus far assembled is affixed to a typical exhaust machine for pumping out, evacuating and filling the envelope in a conventional manner. In processing the lamp of the present invention, the envelope is filled with a filling having a high thermal conductivity. In the embodiment illustrated in FIGS. 2 and 3, a filling 50 may be helium fill gas supplied at a pressure of about 30 torr. When helium is the fill gas, pressures of about 10 torr to about 700 torr, or even greater, are possible, although the lower pressure the less tendency there is for an undesirable amount of helium to enter the quartz glass of the outer envelope. The envelope 4 is then sealed and the base 24 is attached to the envelope in a conventional manner. The electrical conductors 14 and 16 are welded or soldered to the base at ends 18 and 20 as described herein.

In considering the operation of an electric lamp, such as for example lamp 2, energization is initiated in a conventional manner such that the power source 22 energizes the lamp capsule 36 in a lamp initiation mode. During lamp operation, the current flows through the fuse 48, which is electrically and mechanically connected in series with the electrical conductor 14 and lead wire 42. The helium gas 50 present within the environment 6 enclosed by the envelope 4 conducts heat away from the fuse 48 during energization of the lamp capsule to cool the fuse sufficiently to lower the resistance and power loss in the fuse to thereby increase the efficacy of the lamp and eliminate visual radiation of the fuse, in a normal lamp operation mode. In the event that the outer envelope breaks causing the helium gas to dissipate and the fuse to be exposed to air, the temperature of the fuse will increase sufficiently to ignite the fuse, open the lamp circuit, and extinguish the lamp capsule in an envelope breakage mode. Upon exposure to air, the fuse temperature is elevated sufficiently to ignite the fuse as a result of radiation, convective and conductive heat flowing from the light source, and any resistive self-heating generated by the lamp current flowing through the fuse 48.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. An electric lamp, comprising:
    a sealed first envelope enclosing an environment and being transparent to light;
    a first electrical conductor and a second electrical conductor sealed into and passing through said first envelope and being electrically connectable external of said first envelope to a source of electrical power;
    an electric lamp capsule comprising a sealed second envelope, contained within said environment, a first lead wire and a second lead wire sealed into and passing through said second envelope, said first lead wire being electrically connected to said first electrical conductor, and said second lead wire being electrically connected to said second electrical conductor to provide for a lamp circuit;
    an end-of-life device contained within said environment and being electrically connected in series with said lamp circuit, said end-of-life device being of the type that will ignite during lamp operation in the presence of air to open said lamp circuit; and
    a filling contained within said environment, said filling being inert at least relative to said end-of-life device and having a thermal conductivity high enough to cool said end-of-life device during energization of said electric lamp capsule, within said sealed first envelope, sufficiently to lower resistance and power loss in said end-of-life device, thereby increasing lamp efficacy and eliminating visual radiation of said end-of-life device.

2. The electric lamp of claim 1 further including a lamp base mechanically connected to said first envelope and electrically connected to said first electrical conductor and said second electrical conductor.

3. The electric lamp of claim 2 wherein one of said first electrical conductor and said second electrical conductor is electrically connected to a center tap of said lamp base, and further wherein another of said first electrical conductor and said second electrical conductor is electrically connected to a side tap of said lamp base.

4. The electric lamp of claim 1 wherein said end-of-life device is tungsten.

5. The electric lamp of claim 4 wherein said end-of-life device is a coiled wire.

6. The electric lamp of claim 1 wherein said filling is at least helium.

7. The electric lamp of claim 5 wherein said filling is at least helium.

8. The electric lamp of claim 1 further comprising means for supporting said electric lamp capsule and said end-of-life device.

9. The electric lamp of claim 1 wherein said sealed first envelope comprises a vitreous material having a thickness about 0.5 to 0.75 mm.

10. The electric lamp of claim 9 wherein said end-of-life device is a coiled tungsten wire and said filling is at least helium gas.

11. An incandescent lamp, comprising:
    a sealed, light transmissive tungsten halogen capsule including a first lead wire and a second lead wire;
    a sealed, light transmissive envelope enclosing said capsule and including a first electrical conductor and a second electrical conductor sealed into and passing through said envelope and being electrically connectable external of said envelope to a source of electrical power, said first lead wire and said second lead wire being electrically connected to said first electrical conductor and said second electrical conductor, respectively,
    an oxidizable pyrophoric fuse contained within said envelope and external of said capsule, said fuse being connected electrically in series with said first lead wire and said second lead wire; and
    an inert gas, contained within said sealed, light transmissive envelope, having a thermal conductivity sufficiently high to reduce the temperature of said fuse during operation of said electric lamp within said sealed light transmissive envelope sufficiently to
    (a) reduce resistance and power loss in the fuse;
    (b) increase lamp efficacy; and
    (c) eliminate visible light emission by said fuse.

12. The incandescent lamp of claim 11 further including a lamp base mechanically connected to said envelope and electrically connected to said first electrical conductor and said second electrical conductor.

13. The incandescent lamp of claim 12 wherein one of said first electrical conductor and said second electrical conductor is electrically connected to a center tap of said lamp base, and another of said first electrical conductor and said second electrical conductor is electrically connected to a side tap of said lamp base.

14. The incandescent lamp of claim 11 wherein said fuse is tungsten.

15. The incandescent lamp of claim 14 wherein said fuse is a coiled wire.

16. The incandescent lamp of claim 11 wherein said gas is at least helium.

17. The incandescent lamp of claim 15 wherein said gas is at least helium.

18. The incandescent lamp of claim 11 further comprising a support, for said fuse and said capsule, said support including a first portion mechanically connected to said capsule, an electrically conductive second portion electrically connected to said first lead wire, and an electrically conductive third portion electrically connected to said first electrical conductor, said fuse being electrically connected between said second portion and said third portion.

19. The incandescent lamp of claim 11 further comprising means for supporting said capsule and said end-of-life device.

20. The incandescent lamp of claim 11 wherein said envelope comprises a vitreous material having a thickness about 0.5 to 0.75 mm.

21. The incandescent lamp of claim 20 wherein said end-of-life device is a coiled tungsten wire and said filling is at least helium gas.

22. An electric lamp, comprising:

a light source;

a sealed, light transmissive envelope enclosing said light source and having a first electrical conductor and a second electrical conductor sealed into and passing through said envelope and being electrically connectable external of said envelope to a source of electrical power, said first electrical conductor and said second electrical conductor being electrically coupled to, and forming a closed electrical circuit during lamp operation with, said light source;

means for opening said circuit during operation of said light source in the presence of air; and means for cooling said opening means during operation of said light source within said sealed light transmissive envelope sufficiently to prevent, or at least reduce (a) loss of lamp efficacy and (b) visible light emitted by said opening means.

23. The electric lamp of claim 22 further comprising means for supporting said light source and said opening means.

24. A method of operating an electric lamp of the type having a sealed outer envelope enclosing an environment, and a lamp capsule and end-of-life device within said environment, said end-of-life device being electrically connected in series with said lamp capsule to form a lamp circuit, comprising the steps of:

initiating energization of said lamp capsule in a lamp initiation mode;

conducting heat away from said end-of-life device during said energization to cool said end-of-life device sufficiently to lower resistance and power loss in said end-of-life device to increase electric lamp efficacy and eliminate visual radiation of said end-of-life device, in a normal lamp operation mode; and increasing the temperature of said end-of-life device in the presence of air sufficiently to ignite said end-of-life device, open said lamp circuit, and extinguish said lamp capsule, in an envelope breakage mode.

25. An electrical lamp, comprising:

a sealed first envelope enclosing an environment and being transparent to light;

a first electrical conductor and a second electrical conductor sealed into and passing through said first envelope and being electrically connectable external of said first envelope to a source of electrical power;

an electric lamp capsule comprising a sealed second envelope, contained within said environment, a first lead wire and a second lead wire sealed into and passing through said second envelope, said first lead wire being electrically connected to said first electrical conductor, and said second lead wire being electrically connected to said second electrical conductor, to provide for a lamp circuit;

an end-of-life device contained within said environment and being electrically connected in series with said lamp circuit, said end-of-life device being of the type that will ignite during lamp operation in the presence of air to open said lamp circuit;

a filling contained within said environment, said filling being inert at least relative to said end-of-life device and having a thermal conductivity high enough to cool said end-of-life device during energization of said electric lamp capsule, within said sealed first envelope, sufficiently to lower resistance and power loss in said end-of-life device, thereby increasing lamp efficacy and eliminating visual radiation of said end-of-life device; and a support, comprising:

a first portion electrically connected to said lamp capsule;

a second portion electrically connected to said first lead wire and to said end-of-life device; and a third portion electrically connected to said first electrical conductor and to said end-of-life device.

26. The electric lamp of claim 25 wherein said lamp capsule comprises a stem, and said first portion comprises opposing walls extending from a base and slidingly mounted to said stem.

27. The electric lamp of claim 26 wherein said second portion comprises a first clamp and said third portion comprises a second clamp, said end-of-life device being electrically and mechanically connected to said second portion and said third portion by said first clamp and said second clamp, respectively.

\* \* \* \* \*